United States Patent

Rivière

Patent Number: 5,147,158
Date of Patent: Sep. 15, 1992

[54] CUTTING INSERT
[75] Inventor: Bertrand Rivière, Bourges, France
[73] Assignee: Seco Tools AB, Fagersta, Sweden
[21] Appl. No.: 700,448
[22] Filed: May 15, 1991
[30] Foreign Application Priority Data May 22, 1990 [EP] European Pat. Off. ......... 90850203.2

[51] Int. Cl.⁵ ............................................. B26D 1/00
[52] U.S. Cl. ..................................... 407/113; 407/120
[58] Field of Search ................... 407/113, 114, 115, 8,
407/10, 120, 42, 61; 408/710, 711, 713

[56] References Cited
U.S. PATENT DOCUMENTS 4,065,223 12/1977 Nelson ................................. 407/114
4,449,864  5/1984 Haque et al. ........................ 407/113
4,539,875  9/1985 Lee et al. ......................... 407/119 X
4,606,679  8/1986 Jeremias ............................. 407/114
4,681,487  7/1987 Petterson ........................... 407/114
4,754,789  7/1988 Jonsson .............................. 407/113
4,812,087  3/1989 Stashko ............................. 407/113

Primary Examiner—Larry I. Schwartz
Assistant Examiner—Kevin J. Carroll
Attorney, Agent, or Firm—Burns, Doane, Swecker & Mathis

[57] ABSTRACT

A cutting insert for chip forming machining comprises an upper rake face, a lower face, and an edge clearance face interconnecting said upper and lower faces. The edge clearance face includes a step located intermediate the upper and lower faces. The step defines a fracture zone so that in the event of insert breakage, the location of the breakage can be controlled. The portion of the insert located below the step defines, in effect, an integral shim.

8 Claims, 2 Drawing Sheets

CUTTING INSERT

BACKGROUND OF THE INVENTION

The present invention relates to a cutting insert for chip forming machining, the cutting insert including at least one cutting edge created by the transition between an upper face and an edge face of the cutting insert, the upper face being a rake face and the edge face being a clearance face.

In tools for metal cutting having indexable cutting inserts of hard and wear resistant material, the upper cutting edges are subjected to wear and sometimes a portion or all of the cutting edge fractures and collapses. In the case of partial fractures, only the cutting edge collapses without any risk of damage to the tool body on which the insert is mounted. In the case of more extensive insert fractures, the lower portion of the insert may also collapse, whereby the risk of damage to the tool body increases by a considerable degree. That is, if the cutting insert does not rest upon a shim, a major insert fracture often gives rise to damage of the tool body. In order to avoid such damage, it is usual that the cutting insert rests on a shim of cemented carbide. A usual combination is a cutting insert having a thickness of about 5 mm and a shim having a thickness of 3-5 mm. This results in a total thickness of the cutting insert and the shim of 8-10 mm.

SUMMARY OF THE INVENTION

The aim of the present invention is to present a cutting insert that overcomes the disadvantages discussed above. This is realized by a cutting insert that comprises upper and lower faces spaced apart along a longitudinal center axis of the insert, an edge face interconnecting the upper and lower faces, and at least one cutting edge formed by a transition between the upper face and the edge face. The upper face defines a rake face, and the edge face defines a clearance face. The edge face is provided with a step situated intermediate the upper and lower faces and arranged such that a distance from the center axis to the edge face in a direction perpendicular to the center axis is shorter below the step than above the step. Also, a distance from the lower face to the step in a direction parallel to the center axis is 15-40% of the distance from the lower face to the cutting edge in a direction parallel to the center axis.

Preferably, a depth of the step measured perpendicular to the center axis is about 0.2-2.5 mm. More preferably, that depth is about 0.2-1.5 mm. Most preferably, the depth is about 0.5 mm.

It is preferred that the distance from the lower face to the step is about 25% of the distance from the lower face to the cutting edge.

The intersection of the step with a portion of the edge face situated below the step preferably forms a sharp corner. Most preferably, the step extends perpendicular to the center axis.

BRIEF DESCRIPTION OF THE DRAWINGS

An embodiment of the cutting insert according to the invention is described below, reference being made to the accompanying drawing, wherein.

DETAILED DESCRIPTION OF A PREFERRED EMBODIMENT OF THE INVENTION

Figure 1:
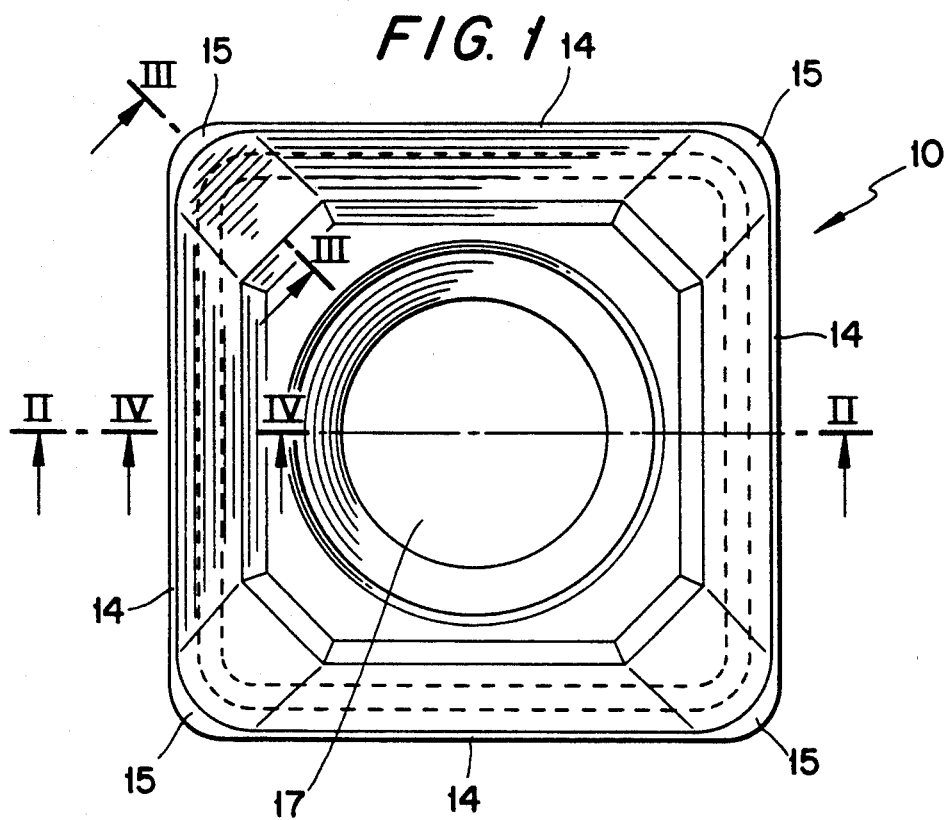
FIG. 1 shows a top view of the cutting insert according to the present invention.
Figure 2:
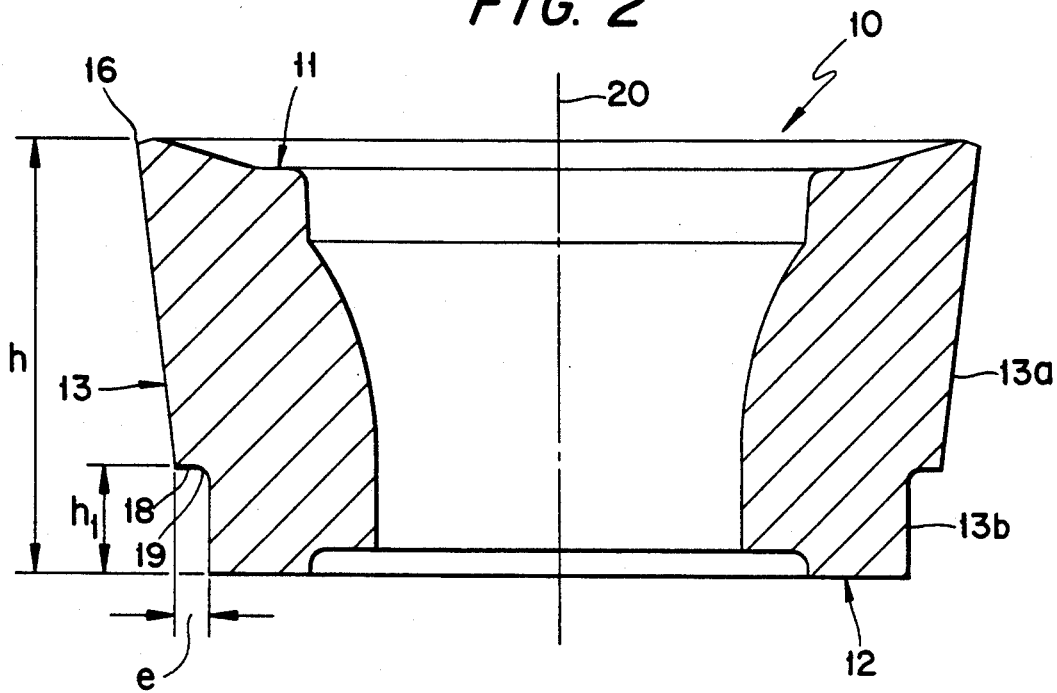
FIG. 2 shows a cross-section of the insert along line II—II in FIG. 1.

The cutting insert 10 shown in FIGS. 1 and 2 includes an upper face 11, a lower face 12, and edges faces 13 interconnecting the upper and lower faces 11, 12. The cutting insert 10 has a positive geometry, i.e., each edge surface 13 forms an acute angle with the upper face 11, the upper face 11 being a rake face and the edge faces 13 being clearance faces.

Figure 4:
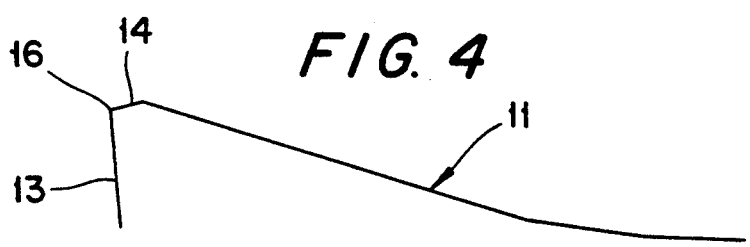
FIG. 4 shows a cross-section of the insert along line IV—IV in FIG. 1.
Figure 3:
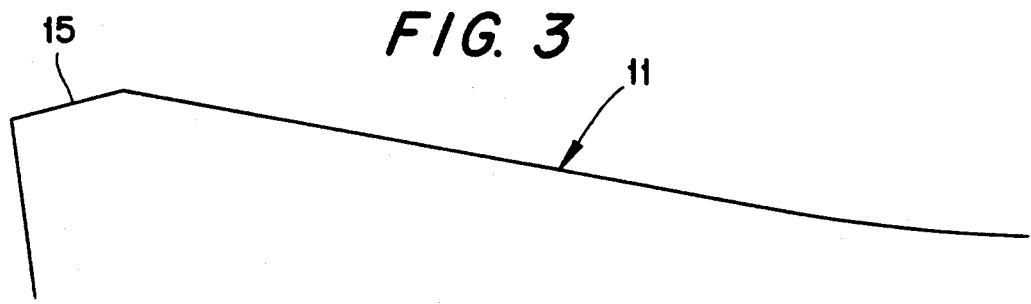
FIG. 3 shows a cross-section of the insert along line III—III in FIG. 1.

As can be seen in from FIGS. 1 and 4, the upper face 11 includes four first chip upsetting faces 14 located between the corner areas of the cutting insert 10. Further, the upper face 11 includes four second chip upsetting faces 15 located in the corner areas of the cutting insert 10 and bridging respective pairs of the first chip upsetting faces 14. The chip upsetting faces 14 and 15 constitute the most peripheral part of the upper face 11. The intersecting lines between the chip upsetting faces 14 and the edge faces 13 form the main cutting edges 16.

In the disclosed embodiment the cutting insert 10 is provided with a through-hole 17 intended to receive a clamping screw (not shown) that secures the cutting tool 10 to the tool body (not shown). The through-hole 17 is coaxial relative to a center line 20 of the insert.

As is most clearly shown in FIG. 2 the edge surfaces 13 are provided with a step 18 extending around the perimeter of the insert at a location intermediate the upper and lower faces 11, 12, but preferably closer to the lower face. The portion 13a of the edge surface 13 that is located above the step 18 has a positive geometry in order to provide the necessary clearance angle of the tool, while the portion 13b of the edge surface 13 has a negative geometry, i.e., the portion 13b is perpendicular to the lower surface 12 and thus has a clearance angle of zero degrees. Since the cutting inert 10 has a square shape and is provided with four cutting edges 16, it follows that four steps 18 are provided, which steps 18 are preferably parallel to the adherent cutting edge 16.

Figure 5:
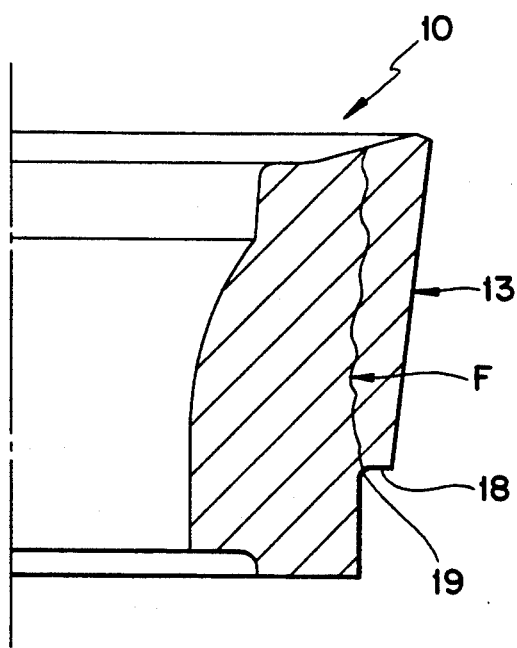
FIG. 5 shows schematically a fracture of a cutting edge.

The step 18 provides a sharp inner corner or notch 19 that constitutes a fracture zone which, in the event of a breakage of the cutting edge controls the progression of the break to leave the lower portion 13b of the cutting insert undamaged, and thus protects the tool body. That is, a fracture initiating at the cutting edge (see FIG. 5) will progress toward the corner 19, due to the internal stress concentrations produced at that corner by the presence of the notch. Hence, only the portion of the insert situated radially outwardly of the notch will break off, thus sparing the lower portion 13b, which, in turn, protects the tool body on which the insert is seated.

The lower portion 13b thus defines, in effect, a shim and thus eliminates the need for a separate shim as well as the cemented carbide material needed to make such a shim.

Concerning the dimensions shown in FIG. 2 the following is to be said. The step height $h_1$ (measured parallel to the center axis 20) is 15 to 40% of the insert height h, preferably 25% thereof. This is possible since the "shim" 13b constitutes an integral part of the cutting insert 10. Thus, the height $h_1$ does not constitute too large a part of the height h which would unduly diminish the strength of the cutting edge and render the cutting edge susceptible to fractures at relatively small loads. As noted above, the insert has, in effect, an integral shim 13b, the transition between the cutting inert and the integrated shim being defined by the step 18. By such an arrangement the total amount of cemented carbide required to make a cutting insert and a "shim" is reduced.

The radial depth e of the step 18 is a function of the height $h_1$ and the clearance angle. The depth e is preferably in the range 0.2–2.5 mm, more preferably in the range 0.2–1.5 mm. A most preferred value of e is about 0.5 mm.

Although the described embodiment of the invention refers to a cutting insert having positive geometry, the invention is also applicable to cutting inserts having negative geometry.

The present invention has been described in connection with a preferred embodiment of the invention and thus it will be appreciated by those skilled in the art that additions, substitutions, and deletions not specifically described, may be made without departing from the spirit and scope of the invention as defined in the appended claims

What is claimed is:

1. A cutting insert for controlling undesired insert breakage during chip forming machining, comprising upper and lower faces spaced apart along a longitudinal center axis of said insert, an edge face interconnecting said upper and lower faces, and at least one cutting edge formed by a transition between said upper face and said face, said upper face defining a rake face, and said edge face defining a clearance face, said edge face provided with a step situated intermediate said upper and lower faces and arranged such that a distance from said center axis to said edge face in a direction perpendicular to said center axis is shorter below the step than above the step, and a distance from said lower face to said step in a direction parallel to said center axis is 15–40 percent of a distance from said lower face to said cutting edge in said direction parallel to said center axis, wherein a depth of said step measured perpendicular to said center axis is about 0.2–2.5 mm, wherein a fracture initiated at the cutting edge will progress toward the intersection of said step and said edge face limiting said fracture to an area of the insert above said step.

2. A cutting insert according to claim 1, wherein said depth is about 0.2–1.5 mm.

3. A cutting insert according to claim 1, wherein said depth is about 0.5 mm.

4. A cutting insert according to claim 1, wherein said distance from said lower face to said step is about 25% of said distance from said lower face to said cutting edge.

5. A cutting insert according to claim 1, wherein said cutting insert has a positive geometry above said step.

6. A cutting insert according to claim 1, wherein a portion of said edge face disposed below said step is perpendicular to said lower face.

7. A cutting insert according to claim 1, wherein an intersection of said step with a portion of said edge face situated below said step forms a sharp corner.

8. A cutting insert according to claim 1, wherein said step extends perpendicular to said center axis.

* * * * *